(12) United States Patent
Poechmuller

(10) Patent No.: US 6,704,114 B1
(45) Date of Patent: Mar. 9, 2004

(54) DEVICE FOR DETECTING WHETHER A VEHICLE SEAT IS OCCUPIED BY MEANS OF A STEREOSCOPIC IMAGE RECORDING SENSOR

(75) Inventor: Werner Poechmuller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,019

(22) PCT Filed: Sep. 28, 1999

(86) PCT No.: PCT/DE99/03111

§ 371 (c)(1),
(2), (4) Date: Aug. 17, 2001

(87) PCT Pub. No.: WO00/29262

PCT Pub. Date: May 25, 2000

(30) Foreign Application Priority Data

Nov. 16, 1998 (DE) .......................... 198 52 653

(51) Int. Cl.⁷ ..................... G01B 11/24; G01R 21/32

(52) U.S. Cl. ....................... 356/601; 280/735

(58) Field of Search ................... 356/601, 602, 356/612, 613, 623; 701/45; 250/559.22; 180/268; 280/735

(56) References Cited

U.S. PATENT DOCUMENTS

| | | | |
|---|---|---|---|
| 4,625,329 A | * 11/1986 | Ishikawa et al. | 382/104 |
| 5,330,226 A | * 7/1994 | Gentry et al. | 280/735 |
| 5,398,185 A | 3/1995 | Omura | |
| 5,608,204 A | 3/1997 | Hofflinger et al. | |
| 5,699,057 A | * 12/1997 | Ikeda et al. | 340/937 |
| 5,737,083 A | 4/1998 | Przytula | |
| 6,116,640 A | * 9/2000 | Tanaka et al. | 280/735 |
| 6,513,830 B2 | * 2/2003 | Breed et al. | 280/735 |

FOREIGN PATENT DOCUMENTS

| | | |
|---|---|---|
| DE | 42 09 536 | 9/1993 |
| DE | 197 41 393 | 3/1998 |

* cited by examiner

Primary Examiner—Rodney Fuller
(74) Attorney, Agent, or Firm—Kenyon & Kenyon

(57) ABSTRACT

The device includes a stereoscopic image recording device having at least one optical sensor which records the scene at the vehicle seat and derives from that a three-dimensional map, partitioned into a plurality of zones, giving for each zone its distance from a reference point. In order to make possible reliable recognition of the manner of the seat's occupation, even during great fluctuations of light intensity, the at least one optical sensor has a nonlinear characteristic curve, describing the correlation between the incident light intensity and its electrical output signal, whose characteristic curve steepness decreases with increasing light intensity.

8 Claims, 3 Drawing Sheets

DEVICE FOR DETECTING WHETHER A VEHICLE SEAT IS OCCUPIED BY MEANS OF A STEREOSCOPIC IMAGE RECORDING SENSOR

FIELD OF THE INVENTION

The present invention relates to a device for detecting the manner in which a vehicle seat is occupied, a stereoscopic image recording device having at least one optical sensor recording the scene at the vehicle seat, and deriving from that a three-dimensional map partitioned into a plurality of zones, giving, for each zone, the distance from a reference point.

BACKGROUND INFORMATION

Investigations, e.g. by NHTBA (National Highway Traffic Safety Administration) have shown that children, sitting in the passenger seat of the vehicle, in particular in a backward aligned child's seat, have suffered deadly injuries from the realease of an airbag. A releasing airbag, in general, poses a danger of injury to a person in the vehicle seat, when this person, for reasons of sitting position, body size or leaning forward in the direction of the airbag prior to the occurrence of the accident, is at too short a distance from the airbag. There are occupational situations, especially in the case of the passenger seat, in which the airbag should better not be released. Among such occupational situations belongs, for example, the occupation of the vehicle seat by a child's seat, or laying down articles not needing protection, or a much too small clearance between the passenger and the airbag. Intelligent airbag systems for use in the future should be in a position to match the amount of airbag inflation to the size and the sitting position of the current vehicle occupant.

That certainly shows that it is unavoidable, for the control of the airbag's release, to detect the manner of occupation of the vehicle seat, in order to avoid unnecessary release of the airbag, or endangering the person in the vehicle seat. There already are different kinds of devices for recognizing the manner of occupation of the seat. A device for detecting the manner of occupation of a vehicle seat, described in the introduction, which has a stereoscopic image recording system, is described in German Patent No. 197 41 393. With the use of such a stereoscopic image recording device, distances of the vehicle seat area, divided by zones, form a reference point which can be ascertained with the aid of the known triangulation method. A so-called three-dimensional map containing a plurality of zones is generated thereby, from which can be read with great accuracy whether and how the vehicle seat is occupied, or which sitting position a vehicle passenger sitting on it has assumed for the moment. This information can now be used for controlling restraint systems such as airbags or belt tighteners.

The accuracy of a three-dimensional map created by a image recording device depends strongly on the image-taking quality of the optical sensors. The scenic lighting conditions have a strong influence on the image quality. In motor vehicles, especially, very extreme lighting conditions come about. This is true for one, because the motor vehicle is in an open environment. That means that the most varied lighting conditions are possible—day, night, low-in-the-sky and blinding sun, blinding headlights of other vehicles, etc. Besides that, a vehicle can move very fast, so that lighting conditions can change a great deal in a short space of time (e.g. while driving into a shaded region, while leaving a tunnel and the like. Linear optical sensors, as are used for the recognition of seat occupation according to German Patent No. 197 41 393, show a very great dependence on changes in brightness of the recorded scene. In order to reduce as far as possible the great brightness dynamics occurring in the vehicle, a strong light source for lighting the scene being looked at is required, according to German Patent No. 197 41 393.

The present invention now is based on the object of presenting a device, of the kind mentioned at the beginning, which, in spite of the great brightness dynamic, and even without using a very strong light source, can reliably identify the kind of occupation of a vehicle seat.

SUMMARY OF THE INVENTION

The object mentioned is attained, in that the at least one optical sensor, which is contained in the stereoscopic image recording device, has a nonlinear transformer characteristic describing the correlation between the entering light intensity and its electrical output, whose characteristic curve steepness decreases with increasing light intensity. Such a nonlinear optical sensor is capable of recording the scene at the vehicle seat with high resolution, even during great brightness dynamics, only a low-cost light source being required for illuminating the scene.

Optical sensors whose transducer characteristics have a logarithmic pattern are particularly suitable for recording scenes with very great brightness dynamics.

For the realization of a stereoscopic image recording device, either optical sensors arranged at defined distances from one another can be provided, or a stereooptical instrument, which images two images of the vehicle seat, offset to each other by a defined amount, on a single optical sensor.

Preferably, a light source is available for illuminating the scene of the vehicle seat, which shines synchronously with the activation of the image recording device. It is expedient if the light-source shines a light in the infrared region, invisible to the vehicle passengers. In order to keep disturbing scattered light away from the image recording device, an infrared band-pass filter is preferably arranged immediately in front of the at least one optical sensor, whose range lies within the light-sensitive range of the optical sensor.

DETAILED DESCRIPTION

Figure 1:
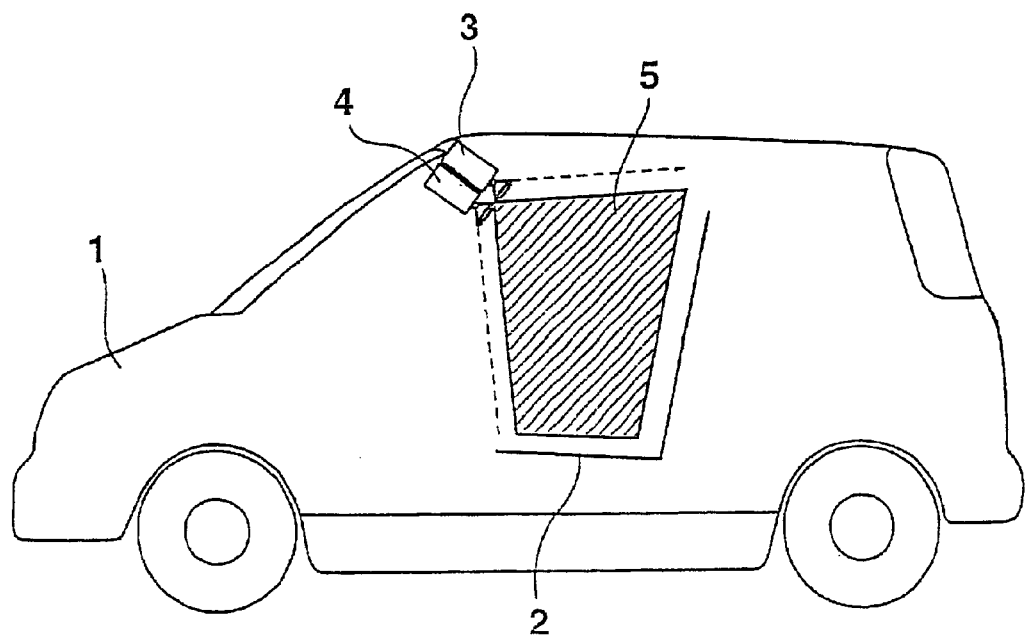
FIG. 1 shows a vehicle with a stereoscopic image recording device.

FIG. 1 shows schematically a vehicle 1 having a vehicle seat 2, for example, a passenger seat. In the area of vehicle's roof, a stereoscopic image recording device is positioned, containing two optical sensors 3 and 4, by which the scene at vehicle seat 2 is recorded. The two optical sensors 3 and 4 record two image segments, offset by a defined distance from each other, indicated in the drawing by broken borderlines. The two image segments form an overlapping area 5 (the hatched area) which exactly encompasses the space of the vehicle seat in which a person or another object can stay. As can be seen in German Patent No. 197 41 393, with such a stereoscopic image recording device one can ascertain the distance of image segments from a reference point (e.g. the location of the optical sensors or the location of the airbag cover), with the aid of known triangulation methods.

Figure 2:
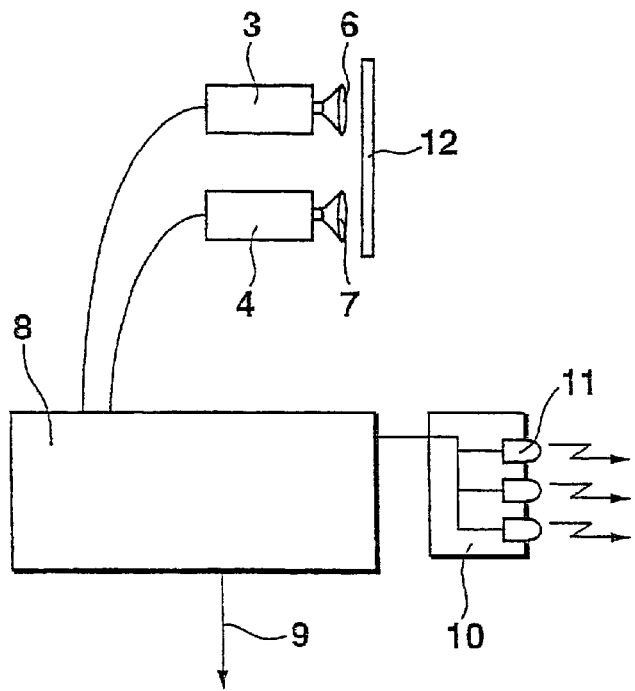
FIG. 2 shows a stereoscopic image recording device having two optical sensors.

The stereoscopic image recording device illustrated in FIG. 2, as shown also in FIG. 1, includes two optical sensors 3 and 4, arranged at a defined distance from each other. Lenses 6 and 7 are arranged in front of the optical sensors 3 and 4, so as to form suitable rays. The output signals of the two optical sensors 3 and 4 are conducted to an image processor 8, which derives a three-dimensional map of the vehicle seat from the images recorded, as will be explained in more detail in connection with FIGS. 5a and 5b, and communicates the seat occupation ascertained from this, via an output signal 9, to a control device, not shown, for restraint devices. The control device can then control the release of one or more airbags and belt tighteners, depending on the information 9.

A light source 10 is provided to illuminate the scene at the vehicle seat. The light source 10 has, for example, a plurality of light diodes 11 emitting infrared light. The image processor 8 switches on the light source 10 synchronously with the image sensors 3 and 4. Thus, the light source 10 is only active when the optical sensors 3 and 4 are switched on for taking an image. In that way, the average emitted optical power can be held to as low as possible, at recording time the scene being illuminated with sufficient brightness. Recording of spurious radiation by optical sensors 3 and 4 can be avoided by placing an infrared band-pass filter, adjusted to the spectral range emitted by the light source 10, in front of sensors 3 and 4.

Figure 3:
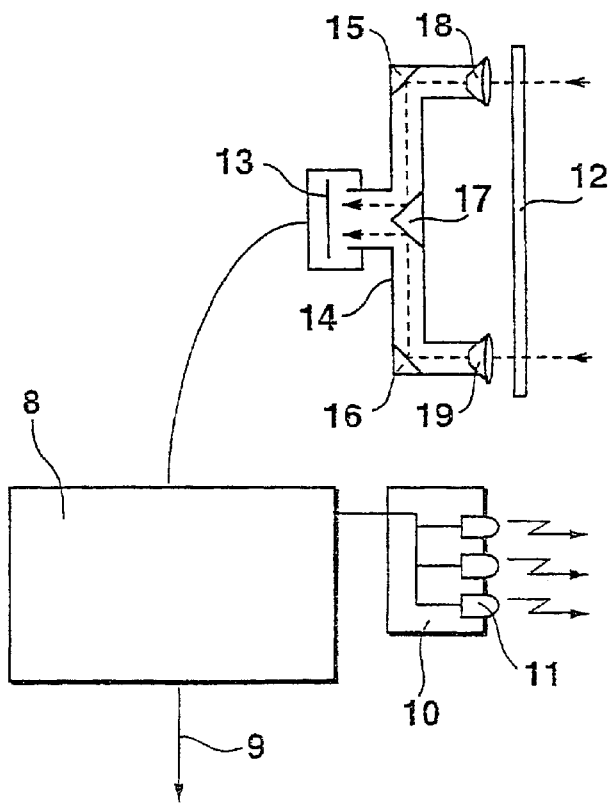
FIG. 3 shows a stereoscopic image recording device having one optical sensor.

As shown in FIG. 3, in place of two optical sensors, one single optical sensor 13 can be put in place, on which, via a stereooptical instrument 14, images are imaged which are offset to each other by a defined amount. The stereooptical instrument has two optical ray paths, having rerouting elements 15, 16 and 17 arranged within them, lenses 18 and 19 being arranged at the input to the stereooptical instrument. The rays taken up by the optical paths, offset to each other, of the stereooptical instrument, strike adjoining, separate sensor zones in the optical sensor 13. That means, a sensor here records two images, which are evaluated in the image processor 8 exactly the same as in the exemplary embodiment according to FIG. 2.

Figure 4:
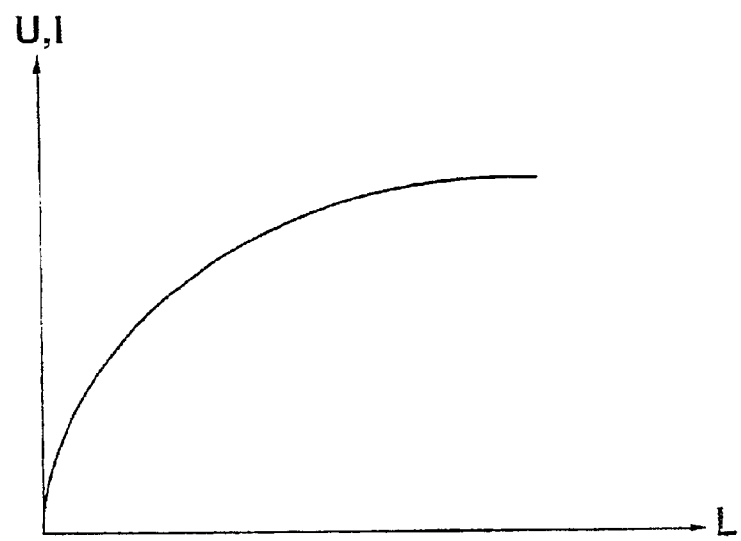
FIG. 4 shows a nonlinear transducer characteristic curve of an optical sensor.

The optical sensors 3, 4, 13 have a transducer characteristic curve shown in FIG. 4, which describes the correlation between incident light intensity L and the electrical output signal (voltage U or current I). The transducer characteristic curve has a nonlinear shape such that the characteristic curve steepness decreases with increasing light intensity. An optical sensor with such a nonlinear characteristic curve is known from German Patent No. 42 09 536. Because of the nonlinear shape of the transducer characteristic curve, the optical sensors 3, 4, 13 convert light signals with great brightness dynamics into a reduced output signal dynamic. Because of that, the contrast of the optical sensors 3, 4, 13 becomes constant, almost independently of the illumination intensity. In the case of such optical sensors, which have a nonlinear, preferably logarithmic transducer characteristic curve, high resolution recording of the scene at the vehicle seat is possible, even at great light intensity fluctuations.

Figure 5A:
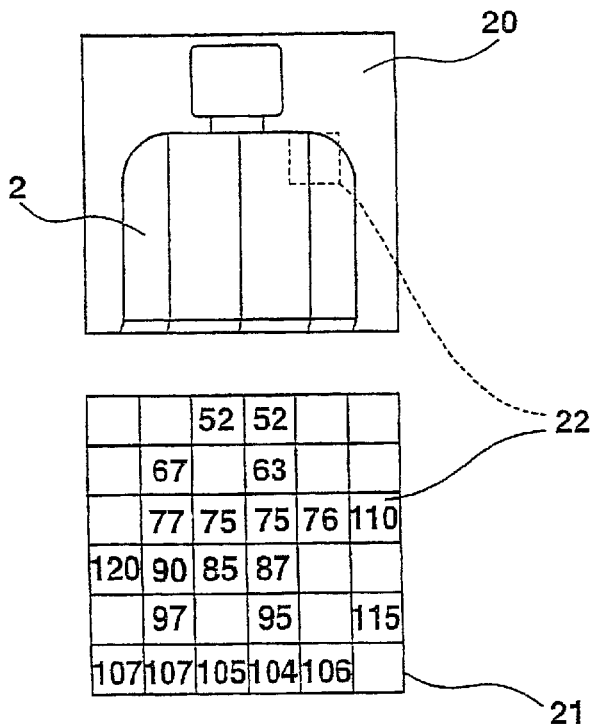
FIG. 5a shows a three-dimensional map of an unoccupied vehicle seat.

In the upper part of FIG. 5a an image segment 20 of vehicle seat 2 is shown, taken by the image recording device. Below that, a three-dimensional map 21, derived by image processor 8 from the two recorded images, is shown. On this map 21, the entire image segment is partitioned into a plurality of zones. The zones are assigned numbers which give the distance of the respective image zone from a reference point. The larger the numerical value, the greater is the distance of the respective image zone from the reference point. Zone 22, for example, has a distance value of 76. Some zones are not furnished with a number because the image processor was not able to ascertain an unequivocal distance value for them.

Figure 5B:
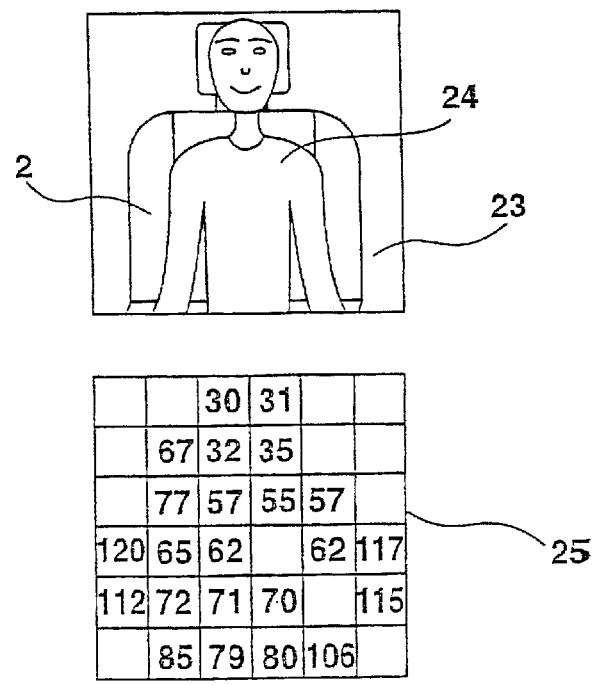
FIG. 5b shows a three-dimensional map of an occupied vehicle seat.

The upper part of FIG. 5b shows an image segment 23 of the vehicle seat 2 occupied by a person 24. Below that is the three-dimensional map 25 ascertained by image processor 8. A comparison of the three-dimensional map 21 of the unoccupied vehicle seat with the three-dimensional map 25 of the occupied vehicle seat makes it clear that, using the described image recording device, unequivocal information about the sitting position of a person occupying the vehicle seat can be obtained. The three-dimensional map also gives unequivocal information on whether the seat is occupied in the first place, whether there is a child's seat on it, whether there is a small or a large person on the vehicle seat, or whether the vehicle seat is not occupied at all by a child's seat or a person, but rather, another article has been put down on it.

What is claimed is:

1. A device for detecting a manner in which a vehicle seat is occupied, comprising:
   a stereoscopic image recording device including at least one optical sensor recording a scene at the vehicle seat, the image recording device deriving, from the scene, a three-dimensional map partitioned into a plurality of zones, indicating for each of the zones a distance from a reference point, the at least one optical sensor having a nonlinear transducer characteristic curve over an entire operating range, describing a correlation between an incident light intensity and an electrical output signal of the at least one optical sensor, a steepness of the characteristic curve decreasing with increasing light intensity; and
   a light source arranged to illuminate the scene at the vehicle seat and to shine infrared light synchronously with an activation of the stereoscopic image recording device.

2. The device according to claim 1, wherein the characteristic curve has a logarithmic shape.

3. The device according to claim 1, wherein the at least one optical sensor includes two optical sensors situated at a predefined distance from each other, the at least two optical sensors simultaneously recording the scene at the vehicle seat.

4. The device according to claim 1, further comprising a stereo-optical instrument taking two images of the vehicle seat, offset by a defined distance from each other, on a single optical sensor.

5. The device according to claim 1, further comprising an infrared band-pass filter situated in front of the at least one optical sensor.

6. The device according to claim 1, further comprising an infrared band-pass filter situated in front of the at least one optical sensor.

7. The device according to claim 1, further comprising an image processor arranged to derive the three-dimensional map from recorded images and to communicate with one of a restraint device and a device to control the restraint device.

8. The device according to claim 1, wherein the light source includes a plurality of light diodes configured to emit infrared light.

\* \* \* \* \*

UNITED STATES PATENT AND TRADEMARK OFFICE
CERTIFICATE OF CORRECTION

PATENT NO.   : 6,704,114 B1
DATED        : March 9, 2004
INVENTOR(S)  : Werner Poechmuller It is certified that error appears in the above-identified patent and that said Letters Patent is hereby corrected as shown below:

Column 2,
Line 63, change "area of vehicle's" to -- area of vehicle 1's --

Signed and Sealed this

Tenth Day of May, 2005

JON W. DUDAS
*Director of the United States Patent and Trademark Office*